United States Patent [19]

Camosso

[11] 3,924,957
[45] Dec. 9, 1975

[54] LOCKING ARRANGEMENT FOR BEARING RINGS
[75] Inventor: Domenico Camosso, Turin, Italy
[73] Assignee: SKF Industrial Trading and Development Company B.V., Amsterdam, Netherlands
[22] Filed: May 24, 1974
[21] Appl. No.: 473,257

[30] Foreign Application Priority Data
June 4, 1973    Italy .................................. 68646/73

[52] U.S. Cl. ................................ 403/352; 308/236
[51] Int. Cl.² ......................................... F16D 15/00
[58] Field of Search .................... 403/350, 351, 352; 287/DIG. 7, 8; 308/236

[56] References Cited
UNITED STATES PATENTS
147,714    2/1874   Verhaven ...................... 287/DIG. 8
1,818,943  8/1931   Cox ............................... 287/DIG. 8
2,222,334  11/1940  Brouwer ............................. 403/351
3,792,880  2/1974   Potter ................................. 403/352

FOREIGN PATENTS OR APPLICATIONS
76,718    2/1918   Switzerland ........................ 403/352

Primary Examiner—Andrew V. Kundrat
Attorney, Agent, or Firm—Sughrue, Rothwell, Mion, Zinn & Macpeak

[57] ABSTRACT

An annular body such as a bearing ring is locked to a supporting shaft by an elastic split ring located in an internal groove in the ring and deformed radially by two plates seated in circumferentially tapering cavities between the ring and the base of the groove, so that displacement of each plate circumferentially deforms the split ring radially into jamming engagement with both the ring and the support.

3 Claims, 6 Drawing Figures

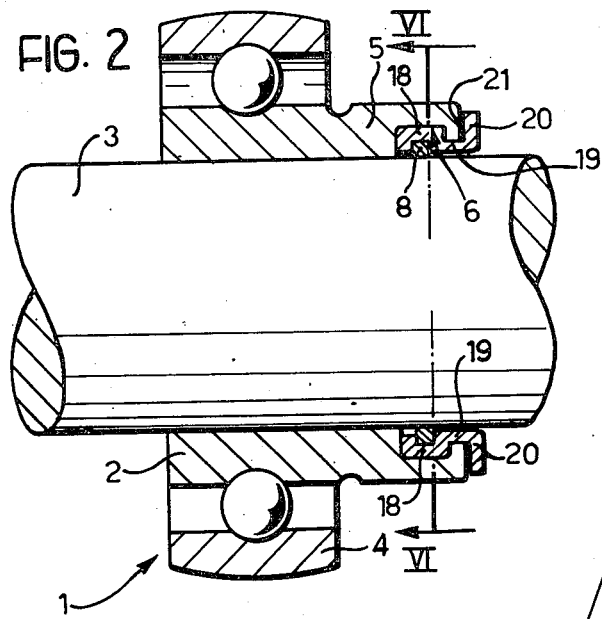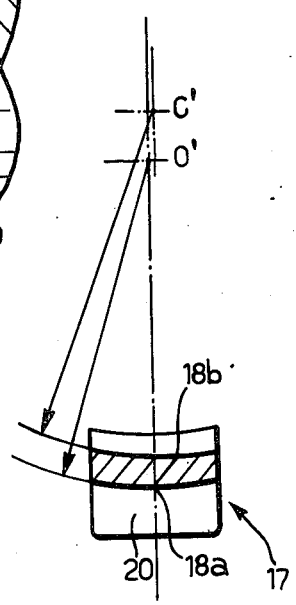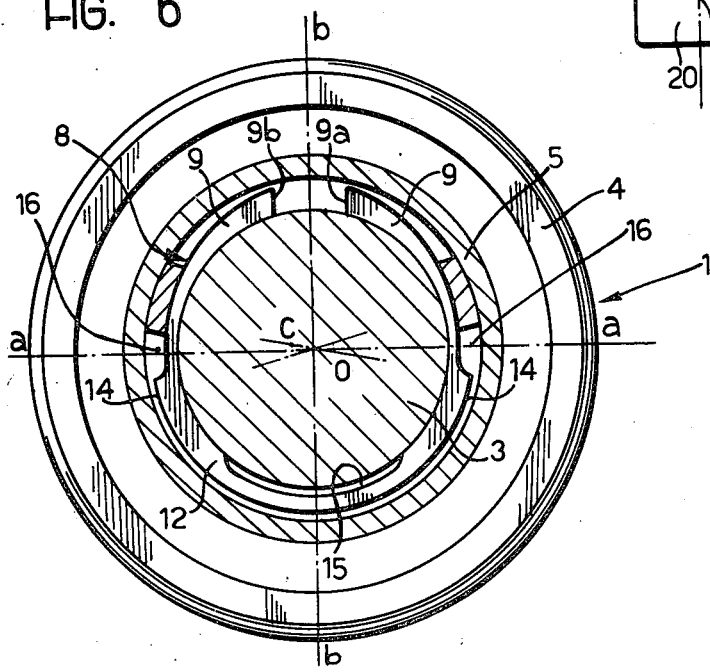

LOCKING ARRANGEMENT FOR BEARING RINGS

BACKGROUND OF THE INVENTION

This invention relates in general to arrangements for effecting locking of an annular body relative to a support, in particular to arrangements for locking the inner ring of a ball or roller bearing to a shaft on which the said ring is mounted.

Numerous arrangements are known for effecting such locking: for example, locking arrangements are known comprising an intermediate element carried by the annular body and adapted to be forced between the said body and the respective support to which it is to be locked. For the purpose of obtaining secure locking, it is necessary that the inter-engaging surfaces of the intermediate element and the annular body on the one hand, and of the said intermediate element and the support on the other, be suitably extensive and moreover, that means be provided to prevent the respective inter-engaging surfaces becoming disengaged, due for example to vibrations.

In some known arrangements for locking a bearing inner ring to a shaft, the intermediate element is forced into a narrow elongate cavity formed between the ring and the shaft by virtue of an eccentric notch in the internal surface of the ring itself. The intermediate element is formed, in some cases, by folding-back a metal plate and is sometimes of such conformation as to require elastic deformation to enable its insertion into the said cavity. In such arrangements, described, for example, in U.S. Pat. Specifications Nos. 2,697,621 and 2,729,479, the area of contact between the intermediate element, the shaft, and the ring is small, being in the form of a thin band. In other known arrangements, described, for example, in German published application DOS 2,136,756, the intermediate element is constituted by a thin curved strip: in this case also there is a limited contact surface between the strip and the shaft, and there is no elastic action tending to maintain the locking arrangement in engagement when the arrangement is subjected to vibrations.

An object of the present invention is to provide an improved locking arrangement of the aforesaid type which affords an increased area of mutual surface contact between the interengaging parts.

SUMMARY OF THE INVENTION

According to the present invention there is provided an arrangement for locking an annular body to a support, of the type referred to, characterised in that the intermediate element is constituted by an elastic split ring housed in a corresponding groove provided in the surface of the annular body in contact with the support, and in that means are provided for effecting radial deformation of the elastic ring to jam the elastic ring in engagement with both the annular body and the support and thereby lock the body relative to the support.

The jamming engagement of the deformed elastic ring with the annular body and the support serves to lock the said body relative to the support with an adequately large surface area.

BRIEF DESCRIPTION OF THE DRAWINGS

The invention will now be more particularly described, merely by way of non-restrictive example, with reference to the accompanying drawings, in which:

FIG. 2 is a section taken on line II—II of FIG. 1;

FIG. 5 is a section taken on line V—V of FIG. 4, and

FIG. 6 is a section taken on line VI—VI of FIG. 2.

DETAILED DESCRIPTION OF THE ILLUSTRATED EMBODIMENT

Figure 1:
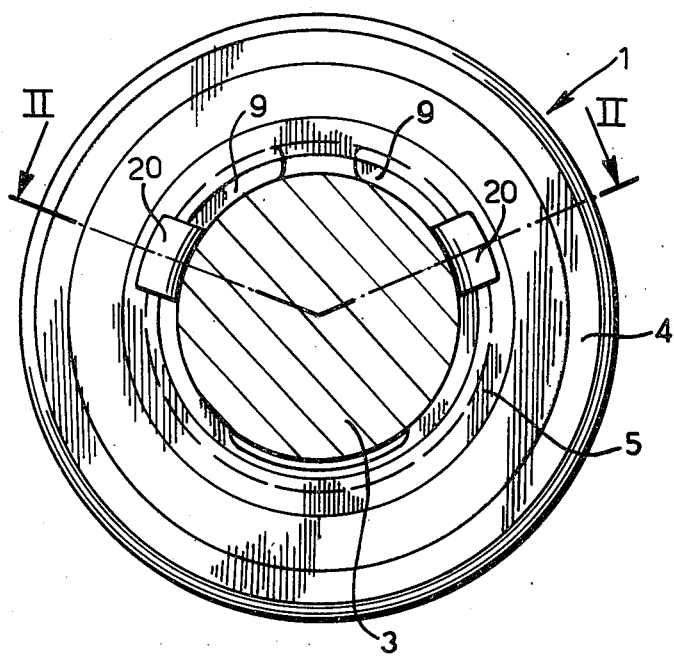
FIG. 1 is a lateral view of a ball bearing having an inner ring which is provided with a locking arrangement according to one embodiment of this invention.

In the drawings reference numeral 1 indicates a ball bearing having an inner ring 2 which is mounted on a support comprising a shaft 3. The inner ring 2 extends axially beyond the outer ring 4 of the bearing, forming a cylindrical sleeve 5 having on its internal surface an annular circumferential groove 6. An intermediate locking element in the form of a split ring 8 of elastic metallic material, for example, spring steel, is located in the groove 6.

Figure 3:
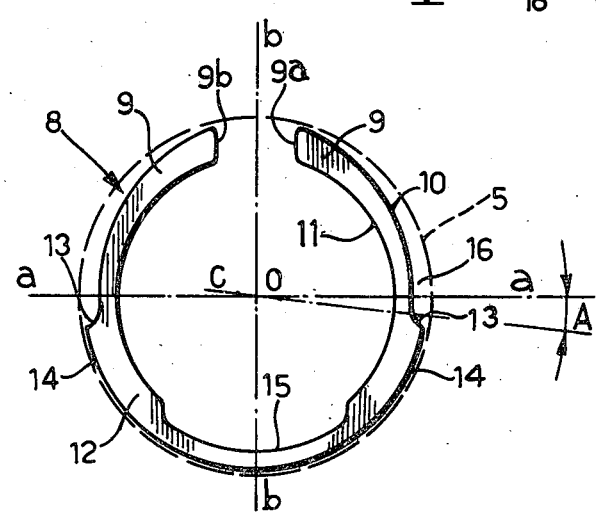
FIG. 3 is a plan view of part of the locking arrangement of FIG. 1.

The split ring 8 (FIG. 3) has adjacent ends 9a, 9b which face each other and which are separated from each other by a gap. Adjoining the two ends 9a, 9b the ring 8 has two tapered sections 9 of decreasing radial thickness which extend angularly for about 90°. Each of the sections 9 is delimited radially by inner and outer surfaces 10, 11 with circular profiles in plan. The internal surface 11 has a circular cross-sectional profile the centre O of which coincides with the axis of the cylindrical sleeve 5, while the external surface 10 has a circular cross-sectional profile the centre C of which is displaced with respect to the centre O. The straight line joining the centres C and O is inclined at an angle A of about 5°–6° to the plane $a - a$ which is perpendicular to the diametral plane of symmetry $b - b$ of the ring 8.

The external surfaces 10 of the two tapered sections 9 of the ring are connected, through short concave sections 13, with the external surface 14 of the remaining part 12 of the ring 8. The surface 14 is cylindrical and has a circular cross-sectional profile concentric with the centre O of the ring 8. The part 12 of the ring 8 has upon its internal surface a circumferentially extending radial channel 15 disposed symmetrically with respect to the plane $b - b$ and subtending at the centre O of the ring 8 an angle between 80° and 120°, in this example about 90°.

Figure 4:
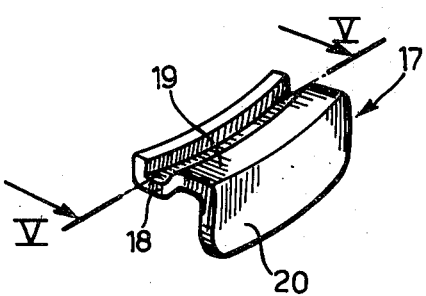
FIG. 4 is a perspective view of another component of the locking arrangement of FIG. 1.

In each of the external cavities 16 formed between the external surfaces 10 of the elastic ring 8 and the internal surface of the groove 6 in the ring 2, there is lodged a plate 17 (FIG. 4) which, in axial section, has a first section 18 of U-shape, a rectilinear second section 19 and a radially outwardly projecting tongue 20. The U-shaped section 18 is housed within the internal groove 6 in the sleeve 5 between the elastic ring 8 and the inner ring 2 of the bearing, while the tongue 20, which is folded back at about 90° with respect to the rectilinear section 19, bears against the lateral end surface 21 of the inner ring 2 of the bearing. The external and internal surfaces of the rectilinear section 19 are part-cylindrical and are coaxial with the axis of the bearing 1. The base of the first section 18, of U-shape, is delimited externally by a cylindrical surface 18a (FIG. 5) having an axis O' and internally by a cylindrical surface 18b having an axis C'. Upon assembly (FIG. 6) the axes O', C' of the surfaces 18a and 18b coincide respectively with the axes O and C of the surfaces 11 and 10 respectively of the split ring 8.

By virtue of the conformation described above, the base of the U-shaped section 18 has, as shown by FIG. 5, a radial thickness which varies in the circumferential direction in a manner similar to the profile of each of the cavities 16.

The locking arrangement operates as follows. Upon assembly, each plate 17 is displaced angularly - by acting upon the tongue 20 - so as to bring it from the wider zone of the respective cavity 16 towards the narrower zone of the same. In this way, the free ends 9a, 9b of the elastic split ring 8 are deformed radially inwardly and press against the shaft 3. By reaction, the inner ring 2 of the bearing 1 is in turn forced against the shaft 3 in correspondence with the zone in which the elastic ring 8 is formed with the channel 15. Thus locking is effected in three zones spaced apart at about 120° with respect to each other.

I claim:

1. An arrangement for locking an annular bearing ring relative to a support comprising an intermediate element adapted to be forced between the bearing ring and the support, said bearing having a groove in the surface of said annular bearing cooperating with said support, said intermediate element being constituted by an elastic split ring located in said groove, said elastic split ring tapering in radial thickness from its free ends to define in cooperation with the cylindrical base surface of the groove a pair of cavities, the radial depth of which vary in the circumferential direction, each tapering section extending angularly for about 90° and being delimited radially by external and internal surfaces having non-concentric circular plan profiles, the center of the internal surface profile coinciding with the axis of the ring and the center of the external surface profile being located on a straight line passing through the center of the internal surface profile and forming, with the plane perpendicular to the diametral plane of symmetry of the ring an angle between 5° and 6°, and means located in each cavity for effecting radial deformation of the elastic ring to join the elastic ring in engagement with both the annular bearing ring and the support and thereby lock the bearing ring relative to the support, wherein the internal surface of the part of the elastic ring comprised between the two sections of tapering thickness has a central radial channel extending circumferentially and subtending at the centre of the ring an angle between 80° and 120°.

2. An arrangement for locking an annular bearing ring relative to a support comprising an intermediate element adapted to be forced between the annular bearing ring and the support, said bearing having a groove in the surface of the ring cooperating with said support, said intermediate element being constituted by an elastic split ring located in said groove, said elastic ring having at least one section the radial thickness of which varies in a circumferential direction to define in cooperation with the cylindrical base surface of the groove at least one cavity the radial depth of which varies in a circumferential direction, and a plate located in each cavity for effecting radial deformation of the elastic ring upon circumferential displacement of said plate toward the narrow end of the respective cavity to join the elastic ring in engagement with both the annular bearing ring and the support and thereby lock the bearing ring relative to the support, wherein the transverse cross-section of the plate when assembled in the bearing has a U-shape profile portion with a circumferentially extending base portion the radial thickness of which varies in a circumferential direction analogous to the tapering profile of the respective cavity in which the plate is located.

3. Locking arrangement as defined in claim 2, wherein the axial section of the plate when assembled in the bearing comprises a first section of U-shape which is locatable within the groove in the annular body and adapted to house in turn the elastic ring, a rectilinear second section parallel to the axis of the bearing, and a radial tongue disposed substantially at right angles to the second section and adapted to bear against a lateral surface of the annular body.

* * * * *